G. W. MARBLE.
POWER TRANSMISSION DEVICE.
APPLICATION FILED MAR. 18, 1911.

1,015,049.

Patented Jan. 16, 1912.
4 SHEETS—SHEET 3.

Witnesses:
Robert N. Weir
T. M. Daggett

Inventor
George W. Marble.
by Foree Bain May
Attys.

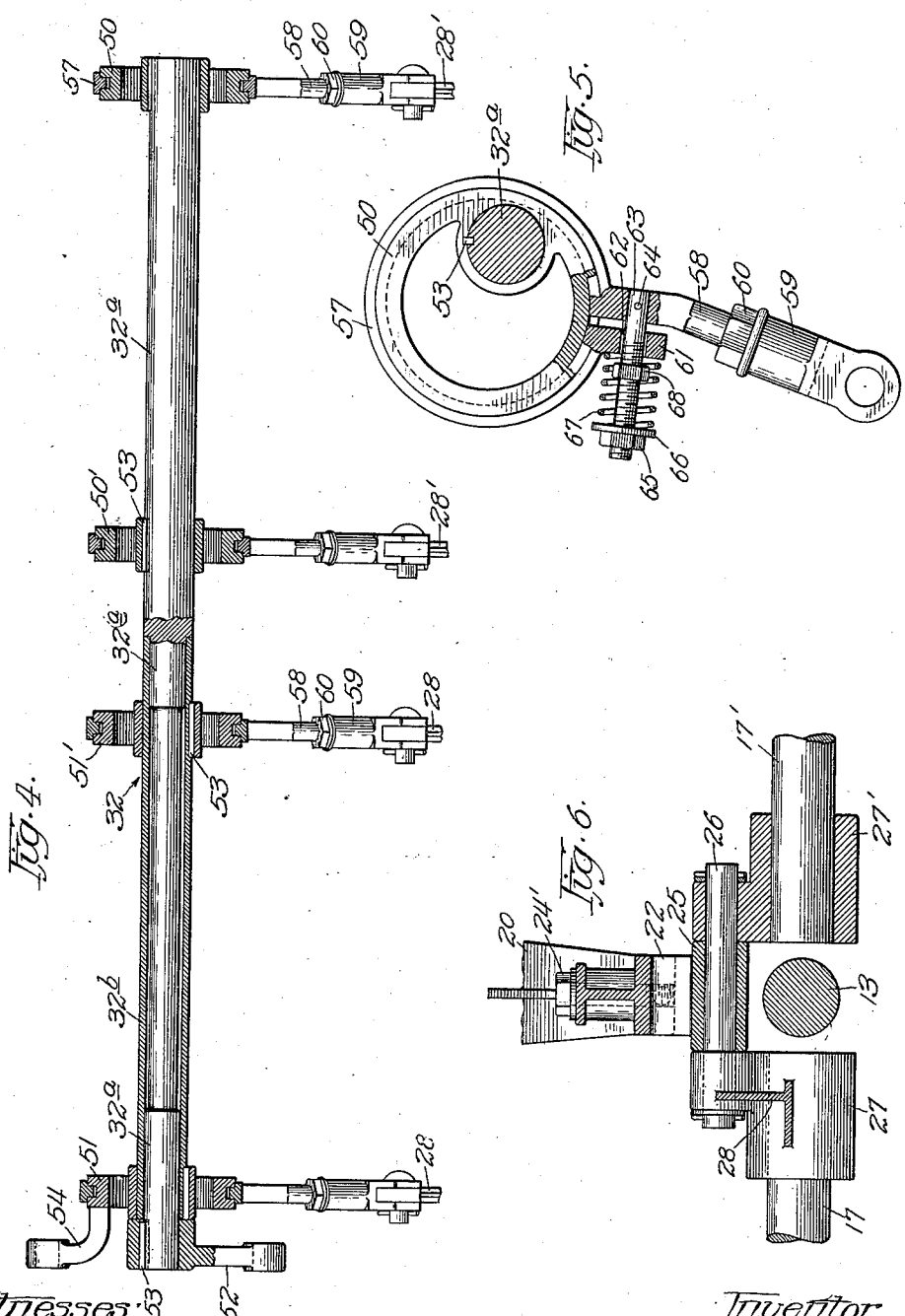

UNITED STATES PATENT OFFICE.

GEORGE W. MARBLE, OF MILWAUKEE, WISCONSIN.

POWER-TRANSMISSION DEVICE.

1,015,049.   Specification of Letters Patent.   Patented Jan. 16, 1912.

Application filed March 18, 1911. Serial No. 615,275.

*To all whom it may concern:*

Be it known that I, GEORGE W. MARBLE, a citizen of the United States, residing at Milwaukee, in the county of Milwaukee and State of Wisconsin, have invented certain new and useful Improvements in Power-Transmission Devices, of which the following is a specification.

My invention relates to improvements in power transmitting devices, and more particularly to variable speed, frictionally operated, power transmitting equipments for motor vehicles, in many respects substantially like a similar device disclosed in my co-pending application, Serial No. 540,796, filed January 29, 1910.

One of the objects of my invention is to generally improve the structure of the device disclosed in my prior application.

Other and further objects of my invention will readily become apparent to persons skilled in the art from a consideration of the specification taken in conjunction with the drawings, wherein—

Figure 1:
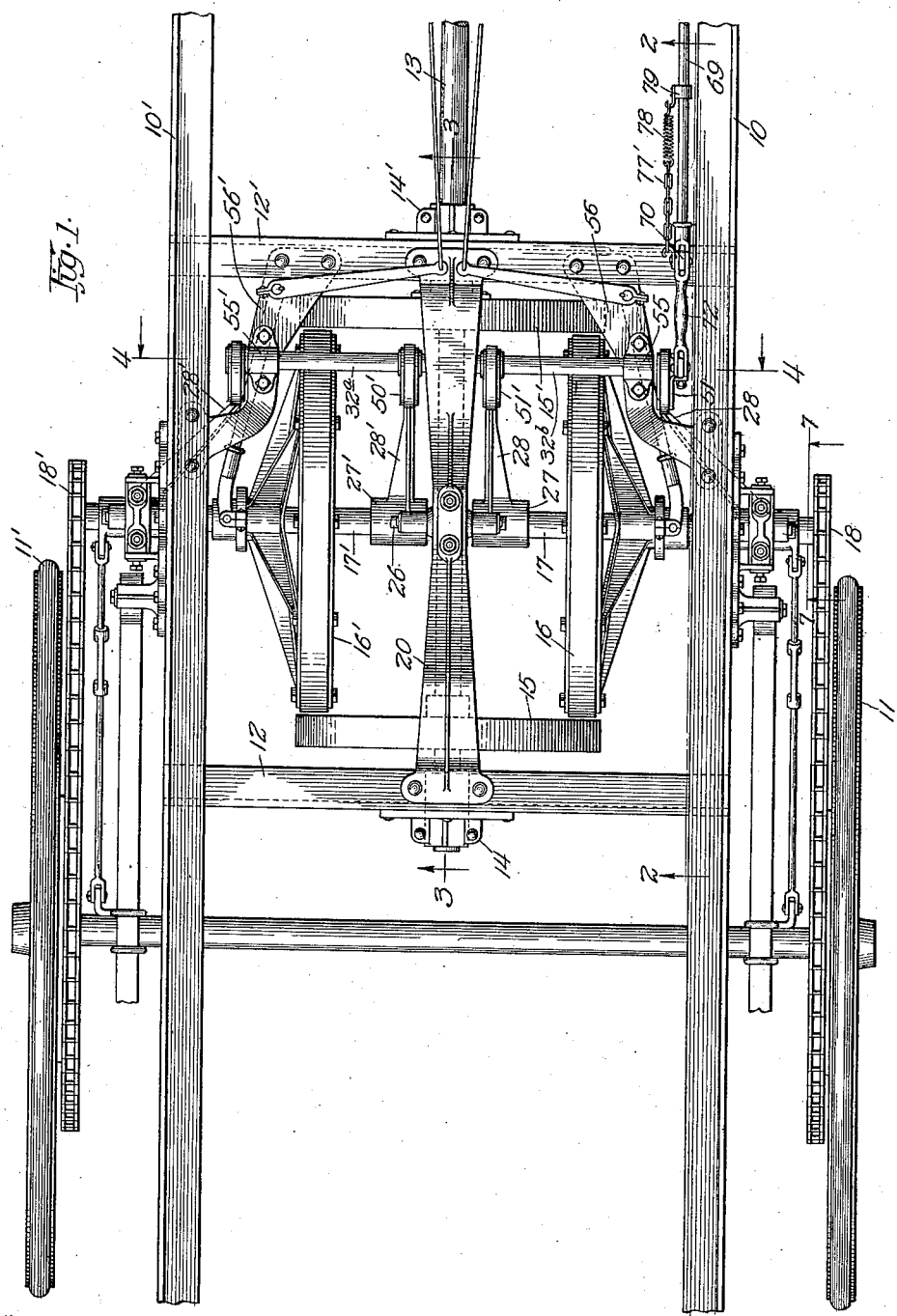
Figure 2:
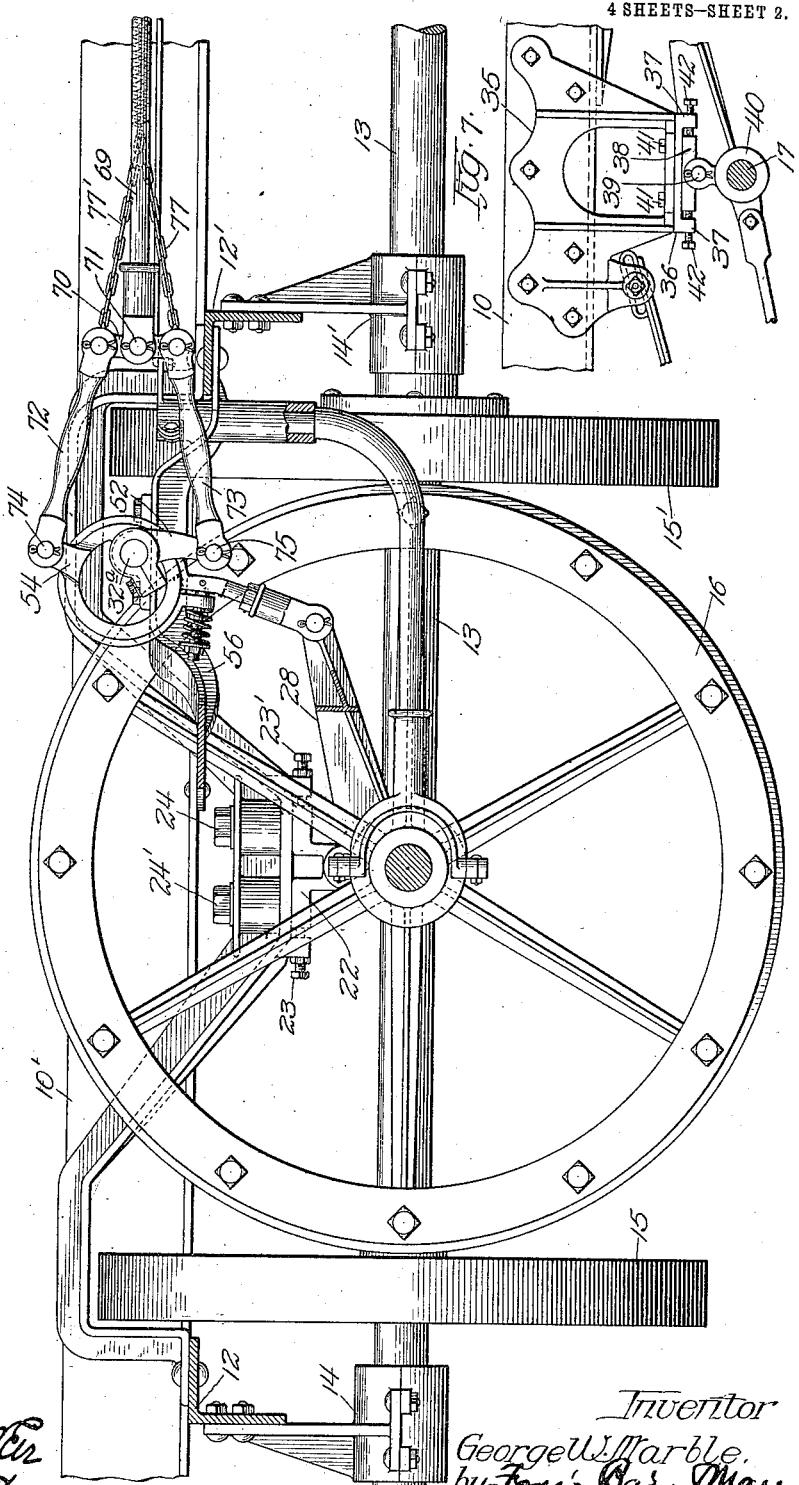
Figure 3:
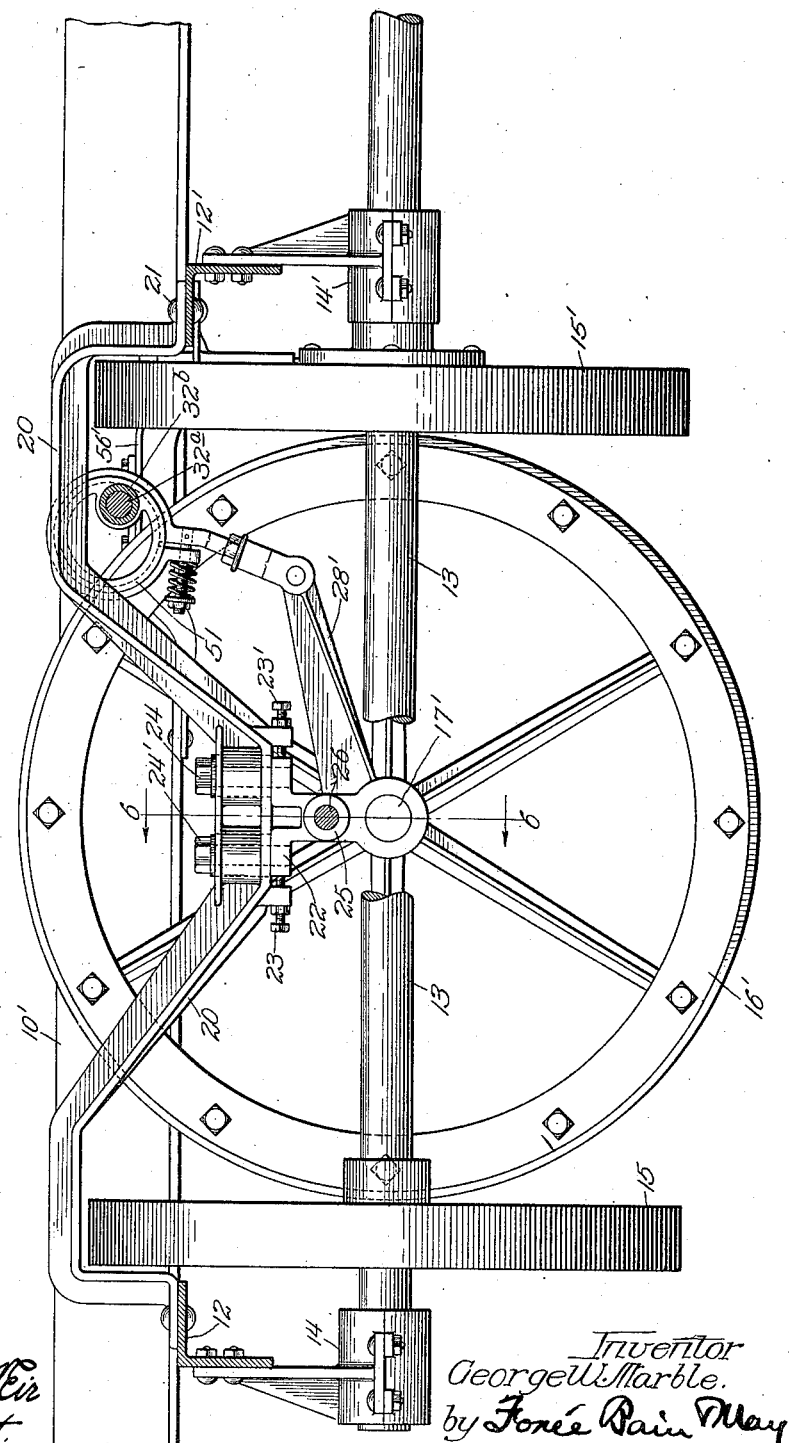

Figure 1 is a plan view of a part of the chassis, showing the application of my invention thereto; Fig. 2 is an enlarged view taken on line 2—2 of Fig. 1; Fig. 3 is a similar view taken on line 3—3 of Fig. 1; Fig. 4 is an enlarged view, partly in section taken on line 4—4 of Fig. 1, showing a longitudinally divided eccentric shaft, with a pair of eccentrics carried by each member thereof; Fig. 5 is an enlarged sectional view of said shafts and one of said eccentrics; Fig. 6 is a transverse section taken on line 6—6 of Fig. 2; and Fig. 7 is a reduced side view of a shaft-supporting bracket.

In all of the views, the same reference characters indicate similar parts.

In Fig. 1, 10—10' indicate the side sills of the frame of an automobile, mounted upon the usual traction wheels, of which only the rear traction wheels 11—11' are shown in the drawings. As in my previous application, the frame preferably provides two cross members, or sills, 12 and 12', forming the fore-and-aft boundaries of the gearing space in which are located the friction wheels and disks of the power transmission device.

The main shaft 13 extends longitudinally of the frame and centrally through the gearing space and receives support from suitable bearing brackets 14—14' suspended from the cross members 12 and 12', respectively. To the main shaft are secured confronting friction disks 15—15', properly spaced apart and rotatable in unison and in the same direction with the shaft. With said friction disks 15—15' coöperate, at what I may term "diagonally opposite" points, independent friction wheels 16—16'. By diagonally opposite coöperation of the wheels and disks, I mean that when a disk 16 and wheel 15 are contacting, disk 16' and wheel 15' likewise contact, or vice-versa, so that rotation in the same direction may be imparted to both wheels 16 and 16'. The wheels 16 and 16' are respectively mounted upon relatively short transverse shafts 17 and 17', each extended from a point of support near the center of the gearing space to a point of support beyond the frame, and each having a positive drive connection with the traction wheels 11 and 11', as by the sprocket-and-chain drive 18 and 18'. It is in my present invention, as in my former application, a desideratum to provide an equipment whereby the positive gearing relation between the respective disk shafts and the traction wheels may remain unchanged regardless of any shifting of the shafts 17 and 17'; and the construction whereby I attain this end will presently be described.

Each shaft 17 and 17' is mounted for bodily fore-and-aft movement in constant parallelism, that is to say, while maintained constantly at right angles to the main shaft, and to this end, instead of mounting a loose housing for movement longitudinally on the main shaft and providing such housing with the inner bearings for the two movable shafts 17 and 17', I relieve the main shaft entirely of the weight which would be imposed upon it by the shafts 17 and 17', and their associated friction disks 16 and 16', as in my former application, and provide, instead, a bearing bracket 20, which is secured to the cross sills 12—12', as at 21. The bracket 20 spans the gearing space, and near its center provides a longitudinally adjustable bearing-supporting bracket 22, engaged between longitudinally adjustable supporting screws and nuts 23—23'; so that the bracket 22 may be adjustably moved longitudinally to desired positions with reference to the confronting friction disks 15 and 15'. The said bracket 22 may be held and clamped in adjusted position by means of the bolts 24—24' that pass through bosses provided on the main bracket 20.

The adjustable bracket 22 has a perforated boss 25, through which a pin 26 passes, for providing support for two independently movable shaft-bearing brackets 27—27' (see Fig. 6). The shaft-bearings 27—27' are adapted to be swung upon their respective bearings provided by the opposite ends of the pin 26, when the said friction wheels are shifted toward or from either of the confronting friction disks 15—15'. By this means, the shaft 13 is relieved of all of the weight otherwise imposed upon it by the sliding sleeve, such as illustrated and described in my former application.

It will be observed that the inboard bearings of the shafts 17—17' are substantial duplicates, and it will be understood that the outer coöperating bearings, for the said shafts, are likewise duplicates, in general construction, so that I will now describe only one of said outside bearings.

To the side member 10 of the frame is properly secured a suitable bracket 35 (shown in Fig. 7). A horizontal foot plate 36, longitudinally flanked by depending lugs 37, receives, flat against its under side, a plate 38, thereby affording support for a pivot stud 39, to which are pivoted ears of an oscillatable bearing member 40, for supporting the outer end of the shaft 17. The pin 39 alines with the pivot pin 26 of the inner bearing and the distance from the shaft center to the pivotal center, for the bearing 40, is the same as that for the bearing member 27.

For close adjustment of the pivot pin 39, and the respective end of the shaft 17 longitudinally of the vehicle frame, the plate 38 is secured to the foot plate 36 by screws 41. These screws pass through longitudinally elongated slots (not shown) in the lower plate of the bracket 35, and adjusting screws 42—42 are provided in lugs 37 for operation to position the plate accurately before the screws 41 are tightened to hold the plate in such adjusted position.

For bodily moving the shafts 17—17' fore and aft, with respect to the vehicle, and in opposite directions with respect to each other, one forwardly and the other aft, I provide a suitable means extending from the compound shaft 32 to a position conveniently controlled by the vehicle driver, to be hereafter specifically described.

The compound shaft comprises two independently oscillating members 32$^a$ and 32$^b$, the part 32$^a$ being provided with two bearing shoulders 32$^c$ and 32$^d$, for the overlying sleeve member 32$^b$. The exposed surface of each shaft member extends to the center of the structure and each member carries a pair of eccentrics 50—50' and 51—51', respectively secured thereto against rotation by means of keys 53. The shaft member 32$^a$ extends entirely through the tubular shaft member 32$^b$, and upon its outward extended end 32$^e$ is a crank-arm 52, secured thereon by means of a key 53. The end eccentric 51 has secured to it a similar crank arm 54. The crank arms 52 and 54, respectively, are means for directly and independently rotating the respective members of the compound shaft 32.

The compound shaft 32 is mounted in fixed bearings 55 and 55', which extend upward from the horizontal frame braces 56 and 56', the latter crossing the forward corners of the gear frame and securely connected to the longitudinal members 10—10' of the automobile frame and to the transverse sill 12', as by rivets, or the like.

The two eccentrics, carried by each member of the compound shaft, and the overlying strap members thereof, are substantial duplicates. Each eccentric includes a strap 57, provided with a radially extended arm 58, which is screw-threaded at its free end for the reception of an adjustable and screw-threaded cap, 59. A check nut 60 is adapted to secure and hold the cap in adjusted position, with reference to the stem 58. The other end of the eccentric strap terminates in the radial extension lug 61, perforated as at 62 for free passage of the bolt 63, which latter is secured in the longer terminal of the eccentric strap 58 by a pin 64. An adjusting nut 65, with a follower 66, is provided for adjusting the tension of the spring 67, which surrounds the bolt 63, and bears against the follower 66 and the extension 61. The arrangement and use of the device is for the purpose of maintaining yielding friction contact between the eccentric and its surrounding strap so as to prevent unnecessary rattle, or noise, by movement of the parts in the event of wear, and furthermore, to cause a more or less frictional engagement of the parts, to prevent their accidental, relative displacement when the said eccentrics are relaxed and not under tension.

The check nut 68 is designed to prevent excessive outward movement of the extension lug 61, and thereby prevents possibility of entire disengagement of the strap from the eccentrics.

To the perforated ends of each of the radial arms 58 are secured the arms 28—28', respectively, which operate the supporting bearings, respectively, of the shafts 17 and 17'.

Attention has heretofore been called to the fact that the compound shaft 32 is a means by which the shafts 17 and 17' are bodily moved fore and aft and their corresponding friction wheels brought into contact with the confronting friction disks of the main drive shaft 13.

In order that each of the friction wheels may be brought into bearing with the face of its respective disk with equal pressure and certainty, I provide an equalizing device for rotating the separate members of the compound shaft, consisting of a reciprocable rod 69, provided on its rear end with a transversely positioned, centrally-pivoted arm 70, pivoted on the bolt 71, carried by the rod 69, and arranged to move freely thereon. To the outer ends of said arm are pivotally connected links 72 and 73, that are in turn pivotally connected to the crank arms 52 and 54 of the compound shaft 32, as at 74 and 75. From this construction it is obvious that when the rod 69 is longitudinally moved forward and the two independent elements of the compound shaft are rotated, by means of the connecting links 72 and 73, connected to the respective crank arms of the said members and to the pivoted link 70, the rotation of the respective members of the shaft 32, acting to raise one set or pair of eccentrics and to depress the other set, brings one of the friction wheels, associated with one set of eccentrics, into contact with one of the friction disks, and brings the other friction wheel into contact with the other friction disk, and that the respective shafts 17 and 17' are thereby moved bodily in their movable bearings heretofore described and are always maintained with their axes in parallel relation with the confronting surfaces of the respective friction disks.

To normally maintain the friction wheels out of contact with either of the friction disks, as when the traction wheels of the vehicle are not in motion, I connect each end of the pivoted arm 70 by means of a flexible medium, as a chain 77—77', to a yielding medium, such as a spring 78, the other end of the spring being connected to the rod 69 as by a collar 79. The chain-and-spring connection between the pivoted arm 70 and the rod 69 will normally hold the friction wheels out of actual contact with the respective disks, as in the position shown in Fig. 2, where the rod 69 is in a retracted position, and the elastic pressure with which the straps 57 are held in their respective eccentrics will prevent any displacement of these parts.

The connection of the rod 69 with the crank arms 52 and 54 of the respective members of the compound shaft 32, through the pivoted arm 70, serves as an equalizing device, whereby the wheels 16—16' are maintained in contact with the respective disks with substantially equal pressure, the equalizing means being self-adjusting for this purpose.

Other portions of the structure which are shown in the drawings, and not pertinent in this application, are specifically described and claimed in my co-pending application, above mentioned.

While I have herein described in some detail a particular embodiment of my invention, it will be apparent that many changes may be made therein, by persons skilled in the art, without departing from the spirit and scope of the appended claims.

What I claim is:

1. In a power transmission device the combination of two confronting friction disks, two opposed friction wheels, between said disks, on opposite sides of the axis of rotation of said disks, a shaft for each of said wheels adapted to be readily moved in parallel paths, to and from said disks, and a self-adjusting equalizing means for moving said shafts and respective wheels into contact with the respective disks.

2. In a friction power transmission device a main shaft, confronting friction disks, spaced apart and mounted on said shaft, a pair of transversely arranged shafts, in the plane of the main shaft, friction wheels on said transverse shafts, and a self-adjusting equalizing means for moving said transverse shafts respectively in opposite directions, to bring their respective wheels into contact with either of said disks with substantially equal pressure.

3. In a device of the character described, a main shaft, confronting friction disks spaced apart and mounted on said shaft, a bracket support, superposed above and independent of said main shaft, bearing members for transversely positioned shafts pivoted to said bracket support, two transversely positioned shafts, one on each side of said main shaft, mounted in said pivoted bearings, friction wheels rotatable with said transverse shafts, and independently movable means for shifting said pivoted members in either direction to bring either of said wheels into contact with either of said disks.

4. In a device of the character described, a combination of two spaced apart, confronting friction disks, two opposed friction wheels, between said disks, on opposite sides of the axis of rotation of said disks, a shaft for each of said wheels adapted to be bodily moved in parallel paths transversely of its axis, to and from said disks, movable bearings for said shafts, a substantially parallel, compound shaft comprising two independently rotatable members each carrying eccentrics connected to said bearings respectively, a centrally pivoted arm having each of its ends connected to one of said shaft members to rotate same, and means connected to the center of said arm to bodily move same, and to thereby bring said wheels into substantially equal contact with either of said disks.

5. In a device of the character described, a frame comprising side members 10, 10', transverse connecting members 12, 12', a power transmission device within said frame, and a supporting bracket, 20, connected as at 21, to said transverse members 12, 12′, said bracket carrying near its middle portion a pendulous freely movable shaft bearing for affording bearing for one member of said power transmitting device.

In testimony whereof I hereunto set my hand in the presence of two witnesses.

GEORGE W. MARBLE.

In the presence of—
 GEO. L. STEPHENSON,
 FORÉE BAIN.

---

Copies of this patent may be obtained for five cents each, by addressing the "Commissioner of Patents, Washington, D. C."